Figure 1:
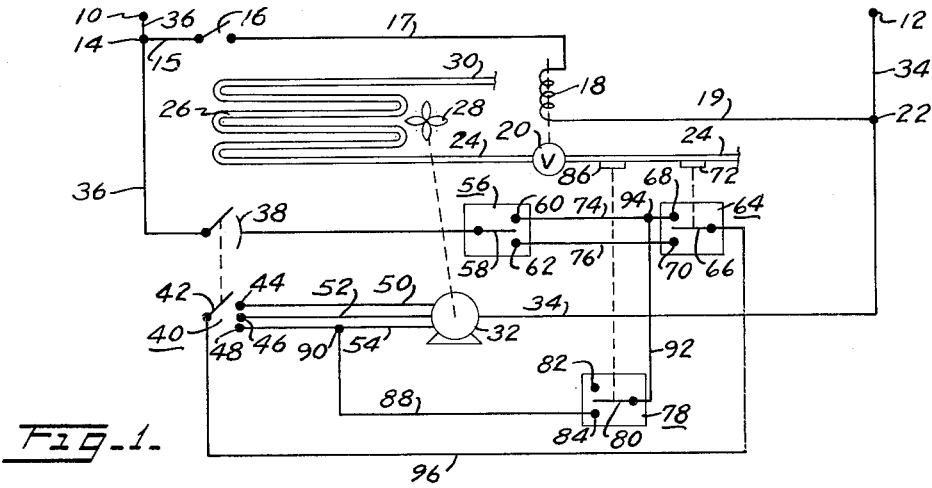

Nov. 2, 1965  L. C PELLEGRINI  3,215,347
HEAT EXCHANGERS
Filed April 30, 1962  2 Sheets-Sheet 1

INVENTOR.
LOUIS C. PELLEGRINI
BY
Rey Eilers
ATTORNEY.

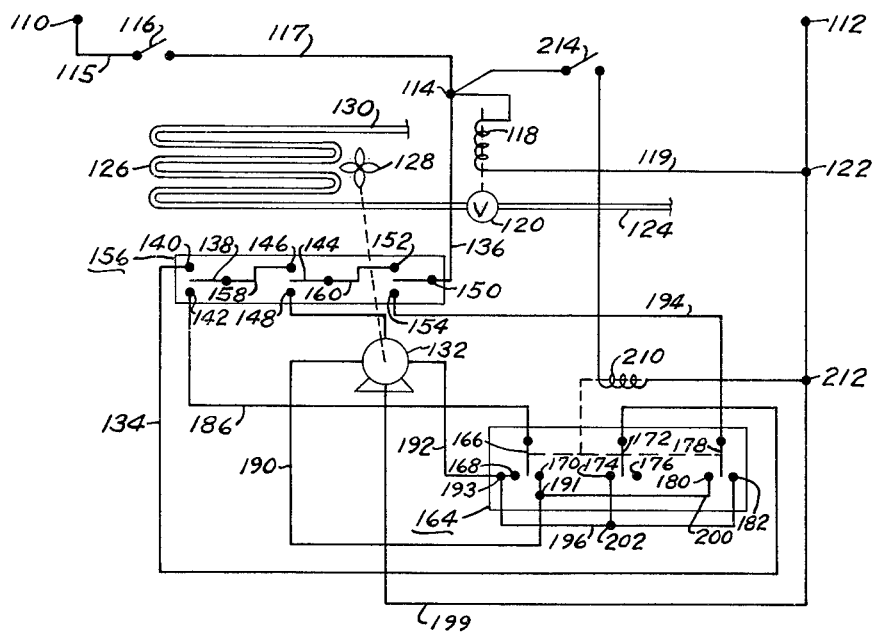

United States Patent Office 3,215,347
Patented Nov. 2, 1965

3,215,347
HEAT EXCHANGERS
Louis C. Pellegrini, St. Louis, Mo., assignor to Marlo Coil Company, St. Louis, Mo., a corporation of Delaware
Filed Apr. 30, 1962, Ser. No. 191,013
12 Claims. (Cl. 236—1)

This invention relates to improvements in Heat Exchangers. More particularly, this invention relates to improvements in control systems for heat exchangers.

It is, therefore, an object of the present invention to provide an improved control system for heat exchangers.

Some heat exchangers are made so they can be supplied with heating medium, during the heating season, to heat rooms or other spaces and can be supplied with cooling medium, during the cooling season, to cool the said rooms or spaces. Such heat exchangers should be provided with control systems which will enable those heat exchangers to maintain carefully regulated temperatures in those rooms or spaces during the cooling season as well as during the heating season.

In some instances, the control systems for such heat exchangers have required manual shifting of control switches. While manually-operated control switches are usually less expensive than automatically-operated control switches, the use of manually-operated control switches can be objectionable. For example, if, at the beginning of the cooling season, the summer-winter switch for a control system were not shifted to the summer position, the thermostat of that control system would not respond to decreases in the temperature within the room or space to reduce the amount of cooling effect supplied to that room or space but would, instead, cause cooling effect to be supplied to that room or space at an undiminished rate. As a result, that thermostat could cause the temperature of the housing for the heat exchanger to fall below the dew point, could make the temperature within the said room or space very uncomfortable, would waste power, and could lead to a service call. Consequently, it would be desirable to provide a heat exchanger, that can be supplied with cooling medium during the cooling season and that can be supplied with heating medium during the heating season, with a control system that automatically shifts the summer-winter switch thereof to the proper positions. The present invention provides such a control system; and it is, therefore, an object of the present invention to provide a heat exchanger, that can be supplied with cooling medium during the cooling season and that can be supplied with heating medium during the heating season, with a control system that automatically shifts the summer-winter switch thereof to the proper positions.

The control system provided by the present invention will, during the heating season, halt operation of the blower for the heat exchanger whenever the upper limit of the desired temperature range is attained. This is desirable, because continued operation of that blower could cause the temperature within the room or other space to seriously "overshoot" that upper limit. Yet, the control system provided by the present invention will not, during the cooling season, halt operation of that blower when the temperature reaches the lower limit of the desired temperature range. This is desirable, because halting of the operation of that blower would permit the humidity within the room or other space to rise, would permit the air within that room or space to become stratified, and could reduce the temperature of the housing for the heat exchanger below the dew point. While it is desirable to avoid halting of the operation of the blower, it would be undesirable to cause further decreases in the temperature within the said room or other space. The present invention makes it possible to halt operation of the blower during the heating season when the temperature within the room or other space reaches the upper limit of the desired temperature range, makes it possible to continue the operation of the blower during the cooling season when the temperature within the said room or other space reaches the lower limit of the desired temperature range, and yet keeps that continued operation of the blower from appreciably reducing the temperature within that room or other space. The present invention does this by causing the thermostat of the control system to automatically halt operation of the blower during the heating season when the temperature within the room or other space rises to the upper limit of the temperature range and to automatically reduce the speed of the blower to its lowest value during the cooling season when the temperature within the room or other space falls to the lower limit of the temperature range. It is, therefore, an object of the present invention to provide a control system for a heat exchanger which will halt the operation of the blower for that heat exchanger during the heating season whenever the temperature reaches the upper limit of its desired range and which will automatically reduce the speed of the blower to its lowest value during the cooling season when the temperature falls to the lower limit of the temperature range.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

Figure 2:
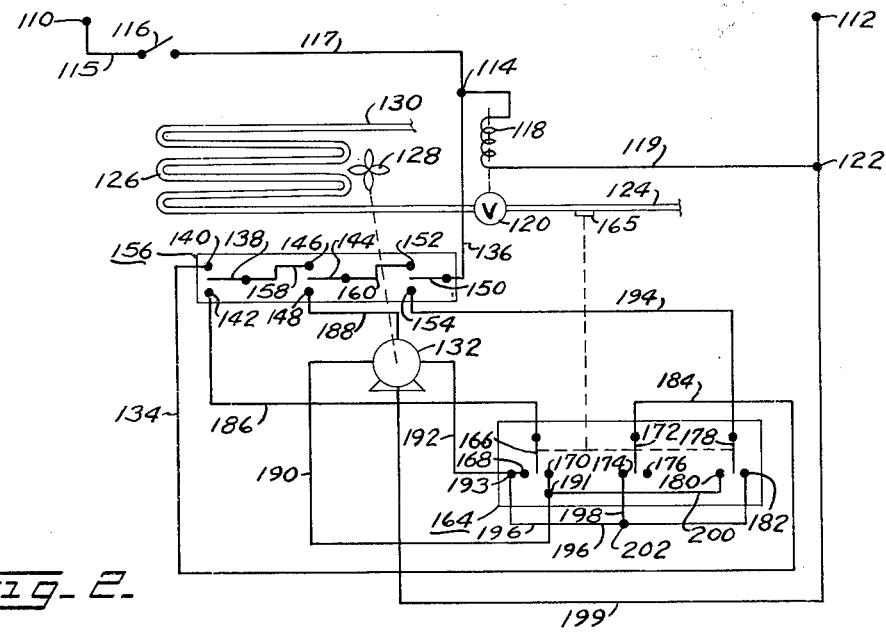

In the drawing, FIG. 1 is a schematic diagram of a heat exchanger and of the control system therefor, FIG. 2 is a schematic diagram of another heat exchanger and of the control system therefor, and FIG. 3 is a schematic diagram of still another heat exchanger and of the control system therefor.

Referring to FIG. 1, the numerals 10 and 12 denote the terminals of a control system that is made in accordance with the principles and teachings of the present invention. A conductor 36 is connected to the terminal 10, and that conductor has a junction 14 therein adjacent that terminal. A conductor 34 is connected to the terminal 12, and that conductor has a junction 22 therein adjacent that terminal. A conductor 15 connects the junction 14 with the movable contact of a manually-operated, single pole, single throw switch 16. The fixed contact of that switch is connected to one terminal of a solenoid 18 by a conductor 17. The other terminal of that solenoid is connected to the junction 22 by a conductor 19.

The solenoid 18 controls a valve 20 which controls the flow of liquid through a pipe 24 that extends to the inlet of a heat exchanger 26. The outlet of that heat exchanger has a pipe 30 connected to it. The pipe 24 and the pipe 30 will be connected to a source of cooling medium during the cooling season and will be connected to a source of heating medium during the heating season. The heat exchanger 26 will be disposed within, or immediately adjacent to, a room or other space; and a blower 28 will be mounted adjacent that heat exchanger to cause air from that room to pass over that heat exchanger and then move back into that room. The heat exchanger 26 can be made in different forms, but it will preferably be made as a finned coil which is suitably mounted within a housing.

The numeral 38 denotes a wiper switch that has an elongated fixed contact and that has a movable contact which can selectively engage that fixed contact. The numeral 40 generally denotes a selector switch that has a movable contact 42 and that has three fixed contacts 44, 46 and 48. Conductors 50, 52 and 54 extend, respectively, from the fixed contacts 44, 46 and 48 to three terminals of a three-speed motor 32. That motor is connected to the blower 28, and can drive that blower to effect movement of air from the said room into heat-exchanging relation with the heat exchanger 26 and then back into that room. While the blower 28 is shown in the form of a propeller, it will usually have the form of a multi-vane blower. The movable contacts of the wiper switch 38 and of the selector switch 40 are "ganged" together so that the wiper switch 38 will be closed when the movable contact 42 is in engagement with any one of the fixed contacts 44, 46 and 48.

The numeral 56 generally denotes a thermostat which will be mounted within the said room; and that thermostat has a movable contact 58 and two fixed contacts 60 and 62. For clarity of showing, the movable contact 58 is shown in position intermediate the fixed contacts 60 and 62, but in actual practice that movable contact will always be in engagement with one or the other of the fixed contacts 60 or 62. That movable contact will be in engagement with the fixed contact 62 whenever the temperature adjacent that thermostat is above a predetermined value, but will shift out of engagement with that fixed contact and into engagement with the fixed contact 60 whenever the temperature adjacent that thermostat falls below a second predetermined value. Subsequently, that movable contact will move out of engagement with the fixed contact 60 and into engagement with the fixed contact 62 whenever the temperature adjacent that thermostat rises to the first said predetermined value.

The numeral 64 generally denotes a temperature-responsive, summer-winter switch. That switch has a movable contact 66 and two fixed contacts 68 and 70. The movable contact 66 will respond to the temperatures adjacent a temperature-sensitive bulb 72, which is mounted in heat-exchanging relation with the pipe 24. For clarity of showing, the movable contact 66 is shown in position intermediate the fixed contacts 68 and 70; but in actual practice that movable contact will always be in engagement with one or the other of those fixed contacts. For example, the movable contact 66 can move into engagement with the fixed contact 70 whenever the temperature of the medium in the pipe 24 falls to seventy degrees Fahrenheit; and thereafter that movable contact will remain in engagement with that fixed contact until the temperature of the medium in the pipe 24 rises to ninety degrees Fahrenheit. As the temperature of the medium in the pipe 24 reaches ninety degrees Fahrenheit, the movable contact 66 will shift out of engagement with the movable contact 70 and into engagement with the fixed contact 68. Thereafter, that movable contact will remain in engagement with the fixed contact 68 until such time as the temperature of the medium in the pipe 24 falls as low as seventy degrees Fahrenheit; and thereupon that movable contact will move out of engagement with the fixed contact 68 and again move into engagement with the fixed contact 70. This means that whenever cooling medium is flowing through the pipe 24 the movable contact 66 will be in engagement with the fixed contact 70 and that whenever heating medium is flowing through that pipe the movable contact 66 will be in engagement with the fixed contact 68.

The numeral 74 denotes a conductor which connects the fixed contact 68 of the summer-winter switch 64 with the fixed contact 60 of the thermostat 56. The numeral 76 denotes a conductor which connects the fixed contact 70 of the summer-winter switch 64 with the fixed contact 62 of the thermostat 56.

The numeral 78 denotes a second temperature-responsive, summer-winter switch; and that switch has a movable contact 80 and two fixed contacts 82 and 84. For clarity of showing, the movable contact 80 is shown in position intermediate the fixed contacts 82 and 84, but in actual practice that movable contact will always be in engagement with one or the other of those fixed contacts. The switch 78 has a temperature-sensitive bulb 86 which is mounted in heat-exchanging relation with the pipe 24; and the temperature of that bulb will control the position of the movable contact 80. For example, whenever the temperature of the medium flowing through the pipe 24 is seventy degrees Fahrenheit or less, the movable contact 80 will be in engagement with the fixed contact 84; and it will remain in engagement with that fixed contact until the temperature of the medium flowing through the pipe 24 rises to ninety degrees Fahrenheit. As the temperature of the medium flowing through the pipe 24 reaches ninety degrees Fahrenheit, the movable contact 80 will move out of engagement with the fixed contact 84 and into engagement with the fixed contact 82. That movable contact will then remain in engagement with the fixed contact 82 until the temperature of the medium flowing through the pipe 24 again falls to seventy degrees Fahrenheit. This means that the movable contact 80 will be in engagement with the fixed contact 84 whenever cooling medium is flowing through the pipe 24 and that the said movable contact will be in engagement with the fixed contact 82 whenever heating medium is flowing through that pipe.

A conductor 88 connects the fixed contact 84 of the summer-winter switch 78 with a junction 90 in the conductor 54. A conductor 92 connects the movable contact 80 of the summer-winter switch 78 with a junction 94 in the conductor 74. A conductor 96 connects the movable contact of the summer-winter switch 64 with the movable contact 42 of the selector switch 40.

The summer-winter switches 64 and 78 are shown as being provided with remotely-located temperature-sensing bulbs. If desired, summer-winter switches could be used which did not have remotely-located temperature-sensitive bulbs; and such summer-winter switches would be strapped in heat-exchanging relation with the pipe 24.

In using the heat exchanger and control system shown in FIG. 1, heat-exchanging medium must be caused to flow through the pipe 24, into the heat exchanger 26, and then through the pipe 30 to the source of the heat-exchanging medium. If the heat exchanger 26 is disposed within or immediately adjacent to a room, in a motel, hotel or other building, which may be left vacant for variable periods of time, the switch 16, the solenoid 18 and the valve 20 will be very useful; because that switch, solenoid and valve facilitate prompt and full control of the flow of heat-exchanging medium through the heat exchanger 26. Specifically, when heat-exchanging medium is supposed to flow through that heat exchanger, the switch 16 can be closed to energize the solenoid 18 and thereby open the valve 20. Conversely, when heat-exchanging medium is not supposed to flow through that heat exchanger, the switch 16 can be opened to de-energize the solenoid 18 and thereby permit the valve 20 to close. If, however, the said room is used for long periods of time, the switch 16 and the solenoid 18 can be eliminated, and the valve 20 can be eliminated or replaced by a manually-operated, flow-control valve.

For purposes of illustration, it will be assumed that the heat exchanger 26 is disposed within a room in a motel, and that the said room has been vacant but is to be readied for occupancy. Further, it will be assumed that the ambient temperature is hot; and this means that the movable contact 58 of the thermostat 56 will be in engagement with the fixed contact 62. To ready the said room for occupancy, the operator of the motel will close the switch 16; and thereupon a circuit will be completed which extends from the terminal 10 via conductor 36, junction 14, conductor 15, switch 16, conductor 17, solenoid 18, conductor 19, junction 22, and conductor 34 to terminal 12. The resulting flow of current will energize the solenoid 18, open the valve 20, and then hold it open. The opening of that valve will permit heat-exchanging medium to flow through the pipe 24, through the heat exchanger 26 to the pipe 30, and then back to the source of heat-exchanging medium. That heat-exchanging medium will be cool and it will cool the temperature-sensitive bulbs 72 and 86; and as the temperatures of those bulbs fall below seventy degrees Fahrenheit, the movable contact 66 will move into engagement with the fixed contact 70 and the movable contact 80 will move into engagement with the fixed contact 84.

Once the operator of the motel has closed the switch 16, he will select a desired speed for the blower 28, as by moving the movable contact 42 of the switch 40 into engagement with one of the three fixed contacts 44, 46 and 48. If the movable contact 42 is set in engagement with the fixed contact 44 the motor 32 will drive the blower 28 at high speed, if that movable contact is set in engagement with the fixed contact 46 the motor 32 will drive the blower 28 at medium speed, and if that movable contact is set in engagement with the fixed contact 48 the motor 32 will drive the blower 28 at low speed. If the temperature within the room is high, the operator of the motel will usually set the movable contact 42 in engagement with the fixed contact 44. As the movable contact 42 is set in engagement with the selected fixed contact, the wiper switch 38 will be closed.

The closing of the switch 38 will complete a circuit which extends from terminal 10 via conductor 36, junction 14, switch 38, movable contact 58 and stationary contact 62 of thermostat 56, conductor 76, fixed contact 70 and movable contact 66 of summer-winter switch 64, conductor 96, movable contact 42 and stationary contact 44 of selector switch 40, conductor 50, motor 32, conductor 34, and thence past junction 22 to terminal 12. The resulting flow of current will operate the motor 32 at high speed and will thus enable the blower 28 to move substantial quantities of air past the heat exchanger 26.

The flow of air past that heat exchanger will act to reduce the temperature within the said room; and when that temperature falls to the desired level, the movable contact 58 of the thermostat 56 will move out of engagement with the fixed contact 62 and into engagement with the fixed contact 60. As that movable contact moves out of engagement with the fixed contact 62, it will break the circuit which caused the motor 32 to operate at high speed; and as that movable contact moves into engagement with the fixed contact 60 it will complete a circuit which extends from terminal 10 via conductor 36, junction 14, switch 38, movable contact 58 and stationary contact 60 of thermostat 56, conductor 74, junction 94, conductor 92, movable contact 80 and stationary contact 84 of summer-winter switch 78, conductor 88, junction 90, conductor 54, motor 32, conductor 34, and thence past junction 22 to terminal 12. The resulting flow of current will cause the motor 32 to operate at low speed, even though the movable contact 42 of the selector switch 40 is set in engagement with the high speed contact 44.

The motor 32 will continue to run at low speed as long as the positions of the switches 16, 38 and 40 are not disturbed and as long as the temperature adjacent the thermostat 56 does not rise appreciably. However, when that temperature does rise appreciably, the movable contact 58 of thermostat 56 will move out of engagement with the fixed contact 60 and back into engagement with the fixed contact 62. As that movable contact moves out of engagement with the fixed contact 60, it will interrupt the circuit which caused the motor 32 to operate at low speed, and as that movable contact moves back into engagement with the fixed contact 62 it will reestablish the circuit which caused that motor to operate at high speed. That motor will then continue to operate at high speed until the switch 16 or the switches 38 and 42 are shifted or until the temperature adjacent the thermostat 56 again falls to the desired level.

It will be noted that when the temperature within the room fell to the desired level and caused the movable contact 58 of the thermostat 56 to move out of engagement with the fixed contact 62 and into engagement with the fixed contact 60, the motor 32 was not permitted to come to rest but, instead, was caused to operate at low speed. This is very desirable because it enables the heat exchanger 26 and the blower 28 to keep the humidity within the room from rising unduly. Further, it keeps the air within the room from becoming stratified; and it would be undesirable to permit that air to become stratified because the thermostat 56 might not respond accurately to stratified air. Moreover, it keeps the housing for the heat exchanger from "sweating," as by keeping the temperature of that housing above the dew point.

Once the temperature within the room has fallen sufficiently to be comfortable, the occupant of the room may want to shift the movable contact 42 of the switch 40 into engagement with the fixed contact 46; because in doing so he can reduce the air movement in the room. The shifting of the movable contact 42 into engagement with the fixed contact 46 will interrupt the circuit which caused the motor 32 to drive the blower 28 at high speed, and it will also complete a circuit which extends from terminal 10 via conductor 36, junction 14, switch 38, the movable contact 58 and fixed contact 62, conductor 76, the stationary and movable contacts 70 and 66 of summer-winter switch 64, conductor 96, movable contact 42 and stationary contact 46 of selector switch 40, conductor 52, motor 32, conductor 34, and then past junction 22 to terminal 12. The resulting flow of current will cause the motor 32 to drive the blower 28 at medium speed. If the amount of air moved by the blower 28 at medium speed is sufficient to enable the temperature of the air within the room to fall to the point where the movable contact 58 shifts out of engagement with the fixed contact 62 and into engagement with the fixed contact 60, the control system will alternately cause the motor 32 to operate at medium speed and low speed. Specifically, whenever the moveable contact 58 engages the fixed contact 62 the motor 32 will drive the blower 28 at medium speed and whenever the movable contact 58 engages the fixed contact 60 the motor 32 will drive the blower 28 at low speed.

On some days, the amount of air moved by the blower 28 at low speed will be sufficient to keep the room comfortably cool; and on those days the movable contact 42 of the switch 40 can be set in engagement with the fixed contact 48. At such time, the motor 32 will operate at low speed irrespective of the position of the movable contact 58. Specifically, if the movable contact 58 is in engagement with the fixed contact 62, current will flow from terminal 10 via conductor 36, junction 14, switch 38, movable contact 58 and fixed contact 62, conductor 76, fixed and movable contacts 70 and 66 of summer-winter switch 64, conductor 96, the movable and fixed contacts 42 and 48 of switch 40, junction 90, conductor 54, motor 32, conductor 34, and thence past junction 22 to terminal 12; and if the movable contact 58 is in engagement with the fixed contact 60, current will flow from terminal 10 via conductor 36, junction 14, switch 38, the movable and fixed contacts 58 and 60, conductor 74, junction 94, conductor 92, the movable and fixed contacts 80 and 84 of summer-winter switch 78, conductor 88, junction 90, conductor 54, motor 32, conductor 34, and thence past junction 22 to terminal 12.

The capacity of the heat exchanger 26, the capacity of the blower 28, and the temperature of the cooling medium will be selected so that under all normal operating conditions the motor 32 can operate on a continuous basis during the cooling season without unduly cooling the room. During those days in the spring and fall when cooling is not needed, the switches 16, 38 and 40 will be left open.

In the foregoing illustration it was assumed that the room was being readied for occupancy during the cooling season. Where that room is to be readied for occupancy during the heating season, the proprietor of the motel will again close the switch 16 and then subsequently select a desired speed for the blower 28. This is desirable because it relieves the proprietor of the motel of any need of learning, remembering, and following two different procedures.

While the proprietor of the motel will follow the same procedure in the heating season that he followed in the cooling season, the heat exchanger 26 will provide heat instead of cooling because the heating medium will be heated instead of cooled. Specifically, at the end of the cooling season the cooling unit for the motel will be de-energized, and will be disconnected from the pipes 24 and 30 by valves, not shown; and the heating unit for the motel will be energized, and will be connected to the pipes 24 and 30 by further valves, not shown. In this way, heat will be available to the pipe 24 throughout the heating season.

If it is assumed that the room is cold, the movable contact 58 of the thermostat 56 will be engagement with the fixed contact 60. Also, as soon as the solenoid 18 responds to the closing of switch 16 to open the valve 20, the heated medium flowing through the pipe 24 will enable the bulbs 72 and 86 to cause the movable contacts 66 and 80, respectively, of the summer-winter switches 64 and 78 to shift into engagement with the fixed contacts 68 and 82. This means that if movable contact 42 of the selector switch 40 is set in engagement with the fixed contact 44, current will flow from terminal 10 via conductor 36, junction 14, switch 38, the movable and fixed contacts 58 and 60 of thermostat 56, conductor 74, past junction 94, fixed and movable contacts 68 and 66 of summer-winter switch 64, conductor 96, the movable and fixed contacts 42 and 44 of selector switch 40, conductor 50, motor 32, conductor 34, and thence past junction 22 to terminal 12. The resulting flow of current will cause the motor 32 to drive the blower 28 at high speed and cause air from the room to pass over the heat exchanger 26 and be heated thereby.

When the temperature adjacent the thermostat 56 rises to a desired level, the movable contact 58 will move out of engagement with the fixed contact 60 and into engagement with the fixed contact 62. As that movable contact moves out of engagement with the fixed contact 60, it will interrupt the circuit which operated the motor 32 at high speed. As that movable contact moves into engagement with the stationary contact 62 it will not be able to energize the motor 32 because the movable contact 66 of the summer-winter switch 64 will remain out of engagement with the stationary contact 70. This is desirable because it means that the blower 28 will be unable to force air to move past the heat exchanger 26 and thereby raise the temperature within the room to uncomfortable values.

When the temperature of the air adjacent the thermostat 56 again falls to the point where the movable contact 58 will re-engage the fixed contact 60, the circuit which operated the motor 32 at high speed will be reestablished; and thereupon that motor will again drive the blower 28 at high speed. With this arrangement, the motor 32 will alternately operate at high speed and then come to rest in response to changes in the temperature of the air adjacent the thermostat 56.

Once the temperature within the room has risen sufficiently to be comfortable, the occupant of the room may want to shift the movable contact 42 of the selector switch 40 into engagement with the fixed contact 46 of that switch; because in doing so he can reduce the air movement in the room. The shifting of the movable contact 42 into engagement with the fixed contact 46 will interrupt the circuit which caused the motor 32 to drive the blower 28 at high speed, and it will also complete a circuit which extends from terminal 10 via conductor 36, junction 14, switch 38, the movable and fixed contacts 58 and 60 of thermostat 56, conductor 74, junction 94, the fixed and movable contacts 68 and 66 of summer-winter switch 64, conductor 96, the movable and fixed contacts 42 and 46 of selector switch 40, conductor 52, motor 32, conductor 34, and thence past junction 22 to terminal 12. The resulting flow of current will operate the motor 32 at medium speed and will cause the blower 28 to move the air in the room past the heat exchanger 26. If that movement of air is sufficient to cause the temperature adjacent the thermostat 56 to rise to the point where the movable contact 58 moves out of engagement with the fixed contact 60 and into engagement with the fixed contact 62, the motor 32 will come to rest. When the temperature adjacent the thermostat 56 again falls far enough to cause the movable contact 58 to move out of engagement with the stationary contact 62 and back into engagement with the fixed contact 60, the motor 32 will again operate at medium speed. In this way, the control system will recurrently operate the motor 32 at medium speed and permit that motor to come to rest as the temperature within the room recurrently falls and rises.

In the event the outside temperature is not overly cool, the occupant of the room may wish to set the movable contact 42 of selector switch 40 in engagement with the fixed contact 48. Thereafter when the movable contact 58 of the thermostat 56 engages the fixed contact 60, current will flow from terminal 10 via conductor 36, junction 14, switch 38, the movable and fixed contacts 58 and 60 of thermostat 56, conductor 74, junction 94, the fixed and movable contacts 68 and 66 of summer-winter switch 64, conductor 96, the movable and fixed contacts 42 and 48 of selector switch 40, junction 90, conductor 54, motor 32, conductor 34, and thence past junction 22 to terminal 12. The resulting flow of current will operate the motor 32 at low speed and will cause the blower 28 to move air past the heat exchanger 26. If that flow of air is sufficient to cause the temperature adjacent the thermostat 56 to rise to the point where it causes the movable contact 58 to shift out of engagement with the stationary contact 60 and into engagement with the stationary contact 62, the motor 32 will come to rest. Thereafter, the control system will recurrently operate the motor 32 at low speed and permit that motor to come to rest as the temperature within the room recurrently falls and rises.

Whenever the motor 32 is de-energized, thermosyphon effect can cause air to continue to move past the heat exchanger 26 and be heated by that heat exchanger. However, the capacity of the heat exchanger 26 and the temperature of the heating medium will be selected so the thermosyphon effect will not appreciably raise the temperature within the room. This means that while the thermosyphon effect will add heat to the room or other space, and will thus be helpful, it will not make the temperature within that room or space uncomfortably high.

The fact that the switches 64 and 78 operate automatically in response to the temperature of the pipe 24 prevents objectionable operation of the heat exchanger 26 in the event the operator of the motel closes switches 38 and 40 without also closing switch 16. For example, if, during the cooling season, the proprietor of the motel were to close the switches 38 and 40 without also closing the switch 16, the motor 32 would not run continuously, and thereby erroneously indicate that the heat exchanger was operating. Instead, that motor would remain de-energized and thereby indicate to the proprietor of the motel that a check of the equipment was needed. Specifically, during the cooling season the pipe 24 will be warm except when the valve 20 is open and cooling medium is flowing through that pipe to the heat exchanger 26; and hence if the motel proprietor fails to close the switch 16 the movable contact 66 will be out of engagement with the fixed contact 70. As a result, the closing of just the switches 38 and 40 will be unable to cause energization of the motor 32, because the movable contact 58 of the thermostat will engage the fixed contact 62 and connect terminal 10 to open contact 70.

Referring to FIG. 2, the numerals 110 and 112 denote the terminals of a second control system that is made in accordance with the principles and teachings of the present invention. A conductor 115 extends between the terminal 110 and the movable contact of a single pole, single throw switch 116. A conductor 117 extends between the fixed contact of the switch 116 and one terminal of a solenoid 118; and that conductor has a junction 114 intermediate the ends thereof. The other terminal of the solenoid 118 is connected to the terminal 112 by a conductor 119, a junction 122 and a conductor 199.

The solenoid 118 controls a valve 120 which, in turn, controls the flow of heat-exchanging medium through a pipe 124 that extends to the inlet of a heat exchanger 126. The outlet of that heat exchanger has a pipe 130 connected to it. The pipe 124 and the pipe 130 will be connected to a source of cooling medium during the cooling season, and will be connected to a source of heating medium during the heating season. The heat exchanger 126 will be disposed within, or immediately adjacent to, a room or other space; and a blower 128 will be mounted adjacent that heat exchanger to cause air from that room to pass over that heat exchanger and then move back into that room. The heat exchanger 126 can be made in different forms, but it will preferably be made as a finned coil which is suitably mounted within a housing.

The numeral 132 denotes a three-speed motor; and that motor is intended to drive the blower 128 at high speed, at medium speed or at low speed. The blower 128 will be suitably connected to the output shaft of the motor 132 by belts, gears or the like.

The numeral 156 generally denotes a thermostat which has a movable contact 138 adjacent fixed contacts 140 and 142, which has a movable contact 144 adjacent fixed contacts 146 and 148, and which has a movable contact 150 adjacent fixed contacts 152 and 154. The movable contact 150 is connected to the junction 114 by a conductor 136. A conductor 160 extends between the fixed contact 152 and the movable contact 144; and a conductor 158 extends between the fixed contact 146 and the movable contact 138. For clarity of showing, the movable contacts 138, 144 and 150 are shown, respectively, in position intermediate the fixed contacts 140 and 142, the fixed contacts 146 and 148, and the fixed contacts 152 and 154. However, in actual practice, the movable contact 138 will always be in engagement with the fixed contact 140 or the fixed contact 142, the movable contact 144 will always be in engagement with the fixed contact 146 or the fixed contact 148, and the movable contact 150 will always be in engagement with the fixed contact 152 or the fixed contact 154.

The thermostat 156 will be mounted within the said room or other space; and the movable contacts of that thermostat will respond to the temperature within that room or other space to move relative to the fixed contacts of that thermostat. Specifically, whenever the temperature within the room or other space is below the lower limit of the temperature differential of thermostat 156, the movable contact 138 will be in engagement with the fixed contact 142, the movable contact 144 will be in engagement with the fixed contact 148, and the movable contact 150 will be in engagement with the fixed contact 154. If the temperature within the room or other space rises, movable contact 150 will shift out of engagement with fixed contact 154 and into engagement with fixed contact 152. If the temperature within the room or other space continues to rise, the movable contact 144 will shift out of engagement with the fixed contact 148 and into engagement with the fixed contact 146. If the temperature within the room or other space reaches the upper limit of the temperature differential of thermostat 156, the movable contact 138 will shift out of engagement with the fixed contact 142 and into engagement with the fixed contact 140. Conversely, if the temperature within the room or other space is initially above the upper limit of the temperature differential of the thermostat 156, the movable contacts 138, 144 and 150 will, respectively, be in engagement with the fixed contacts 140, 146 and 152. If the temperature within the room or other space falls, the movable contact 138 will shift out of engagement with the fixed contact 140 and into engagement with the fixed contact 142. If the temperature within the room or other space continues to fall, the movable contact 144 will shift out of engagement with the fixed contact 146 and into engagement with the fixed contact 148. If the temperature within the room or other space falls to the lower limit of the temperature differential of the thermostat 156, the movable contact 150 will shift out of engagement with the fixed contact 152 and into engagement with the fixed contact 154.

The numeral 164 generally denotes a temperature-responsive, summer-winter switch. That switch has a movable contact 166 adjacent fixed contacts 168 and 170, has a movable contact 172 adjacent fixed contacts 174 and 176, and has a movable contact 178 adjacent fixed contacts 180 and 182. The movable contacts 166, 172 and 178 are "ganged" together so that they always move in unison. A remotely-located, temperature-sensitive bulb 165 is disposed in heat-exchanging relation with the pipe 124; and that bulb can respond to changes in the temperature of the pipe 124 to cause shifting of the movable contacts 166, 172 and 178.

For clarity of showing, the movable contacts 166, 172 and 178 are shown, respectively, in position intermediate the fixed contacts 168 and 170, the fixed contacts 174 and 176, and the fixed contacts 180 and 182. However, in actual practice, the movable contact 166 will always be in engagement with the fixed contact 168 or the fixed contact 170, the movable contact 172 will always be in engagement with the fixed contact 174 or the fixed contact 176, and the movable contact 178 will always be in engagement with the fixed contact 180 or the fixed contact 182. Specifically, whenever cooling heat-exchanging medium is flowing through the pipe 124, the movable contacts 166, 172 and 178 will, respectively, be in engagement with the fixed contacts 168, 174 and 180. However, whenever heating heat-exchanging medium is flowing through the pipe 124, the movable contacts 166, 172 and 178 will, respectively, be in engagement with the fixed contacts 170, 176 and 182.

The numeral 184 denotes a conductor which extends between the fixed contact 140 of the thermostat 156 and the movable contact 172 of the switch 164. The numeral 186 denotes a conductor which extends between the fixed contact 142 of the thermostat 156 and the movable contact 166 of the switch 164. The numeral 188 denotes a conductor which extends between the fixed contact 148 of the thermostat 156 and one terminal of the motor 132. The numeral 190 denotes a conductor which extends between a second terminal of the motor 132 and the fixed contact 170 of the switch 164; and that conductor has a junction 191 intermediate the ends thereof. A conductor 192 extends between a third terminal of the motor 132 and the fixed contact 168 of the switch 164; and that conductor has a junction 193 intermediate the ends thereof. A conductor 194 extends between the fixed contact 154 of the thermostat 156 and the movable contact 178 of the switch 164. The numeral 196 denotes a conductor which extends between the junction 193 in the conductor 192 and the fixed contact 182 of the switch 164. The numeral 198 denotes a conductor which extends between the stationary contact 174 of the switch 164 and a junction 202 in the conductor 196. The conductor 199 which is connected to the terminal 112, and which has the junction 122 intermediate the ends thereof, extends to a fourth terminal of the motor 132. The numeral 200 denotes a conductor which extends from the fixed contact 180 of the switch 164 to the junction 191 in the conductor 190.

As indicated by FIG. 2, a remotely-located temperature-responsive bulb 165 is provided for the summer-winter switch 164. If desired, however, the switch 164 could be made so it was directly responsive to the temperature of the pipe 124; and, in such event, that switch would be strapped directly to that pipe.

In using the heat exchanger and control system shown in FIG. 2, heat-exchanging medium must be caused to flow through the pipe 124, into the heat exchanger 126, and then through the pipe 130 to the source of heat-exchanging medium. If the heat exchanger 126 is disposed within or immediately adjacent to a room, in a motel, hotel or other building, which may be left vacant for variable periods of time, the switch 116, the solenoid 118, and the valve 120 will be very useful; because that switch, solenoid and valve facilitate prompt and full control of the flow of heat-exchanging medium through the heat exchanger 126. Specifically, when heat-exchanging medium is supposed to flow through that heat exchanger, the switch 116 can be closed to energize the solenoid 118 and thereby effect opening of the valve 120. Conversely, when heat-exchanging medium is not supposed to flow through that heat exchanger, the switch 116 can be opened to de-energize the solenoid 118 and thereby permit the valve 120 to close. If, however, the said room is used for long periods of time, the switch 116 and the solenoid 118 can be eliminated, and the valve 120 can be eliminated or replaced by a manually-operated, flow-control valve.

For purposes of illustration, it will be assumed that the heat exchanger 126 is disposed within a room in a motel, and that the said room has been vacant but is to be readied for occupancy. Further, it will be assumed that the ambient temperature is hot; and this means that the movable contacts 138, 144 and 150 will, respectively, be in engagement with the fixed contacts 140, 146 and 152 of the thermostat 156. To ready the said room for occupancy, the operator of the motel need only close the switch 116, thereby completing a circuit which extends from terminal 110 via conductor 115, switch 116, conductor 117, junction 114, solenoid 118, conductor 119, junction 122, and conductor 199 to terminal 112. The resulting flow of current through the solenoid 118 will enable that solenoid to open the valve 120; and thereupon cooling heat-exchanging medium will flow through the pipe 124, the valve 120, the heat exchanger 126, the pipe 130, and then back to the source of heat-exchanging medium. The pipe 124 will promptly become cold; and the temperature-sensitive bulb 165 will respond to the reduced temperature of that pipe to cause the movable contacts 166, 172 and 178 to move, respectively, into engagement with the fixed contacts 168, 174 and 180.

The closing of the switch 116 will also complete a circuit which extends from terminal 110 via conductor 115, switch 116, conductor 117, junction 114, conductor 136, the movable and fixed contacts 150 and 152, conductor 160, the movable and fixed contacts 144 and 146, conductor 158, the movable and fixed contacts 138 and 140, conductor 184, the movable and fixed contacts 172 and 174, conductor 198, junction 202, conductor 196, junction 193, conductor 192, motor 132, conductor 199, and thence past junction 122 to terminal 112. The resulting flow of current will cause the motor 132 to operate at high speed, and thus enable the blower 128 to move substantial quantities of air past the heat exchanger 126.

The flow of air past that heat exchanger will reduce the temperature within the said room; and when that temperature falls below a predetermined level, the movable contact 138 of the thermostat 156 will shift out of engagement with the fixed contact 140 and into engagement with the fixed contact 142. The shifting of that movable contact out of engagement with the fixed contact 140 will interrupt the circuit that operated the motor 132 at high speed; and the shifting of that movable contact into engagement with the fixed contact 142 will complete a circuit which extends from terminal 110 via conductor 115, switch 116, conductor 117, junction 114, conductor 136, the movable and fixed contacts 150 and 152, conductor 160, the movable and fixed contacts 144 and 146, conductor 158, the movable and fixed contacts 138 and 142, conductor 186, the movable and fixed contacts 166 and 168, junction 193, conductor 192, motor 132, conductor 199, and thence past junction 122 to terminal 112. The completion of this circuit will insure continued operation of the motor 132 at high speed; and this is desirable because the temperature within the room will still be too warm to be comfortable.

Continued operation of the blower 128 at high speed will progressively cool the air in the room, and thereby continue to reduce the temperature within the room. As that temperature reaches a predetermined lower value, the movable contact 144 will shift out of engagement with the fixed contact 146 and into engagement with the fixed contact 148. The shifting of the movable contact 144 out of engagement with the fixed contact 146 will interrupt the second of the circuits which operate the motor 132 at high speed; and the shifting of that movable contact into engagement with the fixed contact 148 will complete a circuit which extends from terminal 110 via conductor 115, switch 116, conductor 117, junction 114, conductor 136, the movable and fixed contacts 150 and 152, conductor 160, the movable and fixed contacts 144 and 148, conductor 188, motor 132, conductor 199, and thence past junction 122 to terminal 112. The resulting flow of current will cause the motor 132 to operate at medium speed. The consequent reduction in speed is desirable because it will reduce the air movement within the room, and that reduction in speed will be acceptable because the temperature within the room will be close to the comfort level.

The blower 128 will move air from the room past the heat exchanger 126 at medium speed and will thereby effect continued lowering of the temperature within the room. When that temperature reaches the lower limit of the temperature differential of the thermostat 156, the movable contact 150 will shift out of engagement with the fixed contact 152 and into engagement with the fixed contact 154. As the movable contact 150 shifts out of engagement with the fixed contact 152 it will interrupt the circuit which operated the motor 132 at medium speed; and as that movable contact shifts into engagement with the fixed contact 154 it will complete a circuit which extends from terminal 110 via conductor 115, switch 116, conductor 117, junction 114, conductor 136, the movable and fixed contacts 150 and 154, conductor 194, the movable and fixed contacts 178 and 180, conductor 200, junction 191, conductor 190, motor 132, conductor 199, and thence past junction 122 to terminal 112. The resulting flow of current will operate the motor 132 at slow speed. The slow speed of the motor, the capacity of the blower, and the capacity of the heat exchanger will be such that the movement of air past the heat exchanger 126 at slow speed will provide appreciable dehumidification of the air but will not materially reduce the temperature of the room. This is desirable because it will permit the blower 128 and the heat exchanger 126 to avoid stratification of the air within the room and to provide dehumidification of the air within that room without reducing the temperature within that room to uncomfortable levels.

If the ambient temperature is high enough to cause the temperature within the room to rise, despite the continued movement of air past the heat exchanger 126 at low speed, the movable contact 150 will shift out of engagement with the fixed contact 154 and into engagement with the fixed contact 152. Such shifting of that movable contact will interrupt the circuit which operated the motor 132 at low speed and will re-establish the circuit which operated that motor at medium speed. If the movement of air past the heat exchanger 126 at medium speed is sufficient to prevent further increases in the temperature within the room, the motor 132 will continue to operate at medium speed until the temperature within the room again falls to the lower limit of the temperature range of the thermostat 156; and thereupon the movable contact 150 will again shift out of engagement with the fixed contact 152 and into engagement with the fixed contact 154. At such time the circuit which caused the motor 132 to operate at medium speed will be interrupted, and the circuit which causes the motor 132 to operate at low speed will be re-established.

If the ambient temperature rises to a value at which air moving past the heat exchanger 126 at medium speed can not keep the temperature within the room from increasing, the movable contact 150 will remain in engagement with the fixed contact 152 and the movable contact 144 will shift out of engagement with the fixed contact 148 and into engagement with the fixed contact 146. As the movable contact 144 shifts out of engagement with the stationary contact 148, it will interrupt the circuit which operates the motor 132 at medium speed; and as that movable contact shifts into engagement with the fixed contact 146 it will re-establish the second circuit which operates the motor 132 at high speed. The consequent movement of air past the heat exchanger 126 at high speed will cause that air to reduce the temperature of the room; and thereafter the movable contact 144 will shift out of engagement with the fixed contact 146 and into engagement with the fixed contact 148. Such shifting will interrupt the second circuit which operates the motor 132 at high speed and will again re-establish the circuit which operates that motor at medium speed.

If, subsequently, the movement of air past the heat exchanger 126 at medium speed is sufficient to keep the temperature within the room from rising to the point where the movable contact 144 will again shift into engagement with the fixed contact 146, but is not sufficient to cause the movable contact 150 to shift out of engagement with the fixed contact 152 and into engagement with the fixed contact 154, the motor 132 will operate indefinitely at medium speed. However, if the movement of air past the heat exchanger 126 at medium speed is not sufficient to keep the temperature from rising, the movable contact 144 will again shift back into engagement with the fixed contact 146, and thereby cause the motor 132 to operate at high speed. On the other hand, if the movement of air past the heat exchanger 126 at medium speed is sufficient to effect further reductions in the temperature within the room, the movable contact 150 will shift out of engagement with the fixed contact 152 and into engagement with the fixed contact 154, thereby causing the motor 132 to operate at low speed.

It will thus be seen that the thermostat 156 will cause the motor 132 to operate at the minimum speed necessary to provide sufficient cooling effect to assure comfort for the occupant of the room. This is desirable because it will reduce the noise level within the room whenever that noise level can be reduced without adversely affecting the comfort of the occupant of the room. Further, it will avoid needless drafts within the room, and it will also conserve power.

In the foregoing illustration of the operation of the heat exchanger and control system of FIG. 2, it was assumed that the room was being readied for occupancy during the cooling season. Where that room is to be readied for occupancy during the heating season, the proprietor of the motel again need only close the switch 116. However, the closing of that switch will lead to heating of the room rather than to cooling of the room, because the heat-exchanging medium will be heated instead of being cooled. Specifically, at the end of the cooling season the cooling unit for the motel will be de-energized, and will be disconnected from the pipes 124 and 130 by valves, not shown; and the heating unit for the motel will be energized, and will be connected to the pipes 124 and 130 by further valves, not shown. In this way, heat will be available to the pipe 124 throughout the heating season.

The fact that the switch 164 automatically responds to the temperature of the pipe 124 is important, because it keeps the proprietor of the motel from operating the heat exchanger 126 during the cooling reason with the switch 164 in the winter position. Any operation of the heat exchanger 126 during the cooling season with the switch 164 set in the winter position would be very objectionable, because cooling medium would be flowing through the heat exchanger 126 but the motor 132 would not be operating—the movable contacts 150, 144 and 138 of the thermostat 156 establishing a series circuit to the movable contact 172 of the summer-winter switch 164, but that movable contact being in engagement with fixed contact 176 which is not connected to anything. This means that cooling medium would flow through the heat exchanger 126 but the blower 128 would not move air over that heat exchanger; and the overall result would be that the temperature of the housing for that heat exchanger would fall below the dew point and cause condensate to form and collect. This highly objectionable result is completely avoided by the present invention.

If it is assumed that the room is cold, the movable contacts 138, 144, and 150 will, respectively, be in engagement with the fixed contacts 142, 148 and 154. As soon as the switch 116 is closed, the solenoid 118 will be energized by a circuit which extends from terminal 110 via conductor 115, switch 116, conductor 117, junction 114, solenoid 118, conductor 119, junction 122, and conductor 199 to terminal 112. The resulting flow of current will energize the solenoid 118 with consequent opening of the valve 120. Thereupon, heat-exchanging medium will flow through the pipe 124 and heat that pipe; and the temperature-sensitive bulb 165 will respond to that heat to cause the movable contacts 166, 172 and 178 to shift, respectively, into engagement with the fixed contacts 170, 176 and 182.

The closing of the switch 116 also will complete a circuit which extends from terminal 110 via conductor 115, switch 116, conductor 117, junction 114, conductor 136, the movable and fixed contacts 150 and 154, conductor 194, the movable and fixed contacts 178 and 182, conductor 196, junction 193, conductor 192, motor 132, conductor 199, and thence past junction 122 to terminal 112. The resulting flow of current will operate the motor 132 at high speed; and the blower 128 will move air past the heat exchanger 126 at high speed. That air will act to increase the temperature within the room; and, as that temperature increases, the movable contact 150 will shift out of engagement with the fixed contact 154 and into engagement with the fixed contact 152.

The shifting of the movable contact 150 out of engagement with the fixed contact 154 will interrupt the circuit which operated the motor 132 at high speed. The shifting of that movable contact into engagement with the fixed contact 152 will complete a circuit which extends from terminal 110 via conductor 115, switch 116, conductor 117, junction 114, conductor 136, the movable and fixed contacts 150 and 152, conductor 160, the movable and fixed contacts 144 and 148, conductor 188, motor 132, conductor 199, and thence past junction 122 to terminal 112. The resulting energization of motor 132 will operate that motor at medium speed. The movement of air past the heat exchanger 126 at medium speed will continue to raise the temperature within the room; and when that temperature reaches a higher predetermined level the movable contact 144 will shift out of engagement with the fixed contact 148 and into engagement with the fixed contact 146.

That shifting of the movable contact 144 will interrupt the circuit which operated the motor 132 at medium speed. Also, that shifting of that movable contact will complete a circuit which extends from terminal 110 via conductor 115, switch 116, conductor 117, junction 114, conductor 136, the movable and fixed contacts 150 and 152, conductor 160, the movable and fixed contacts 144 and 146, conductor 158, the movable and fixed contacts 138 and 142, conductor 186, the movable and fixed contacts 166 and 170, junction 191, conductor 190, motor 132, conductor 199, and thence past junction 122 to terminal 112. The resulting flow of current will operate the motor 132 at low speed. The movement of air at low speed past the heat exchanger 126 will continue to cause the temperature within the room to increase; and when that temperature reaches the upper limit of the temperature differential of the thermostat 156, the movable contact 138 will shift out of engagement with the fixed contact 142 and into engagement with the fixed contact 140. The shifting of that movable contact out of engagement with the fixed contact 142 will interrupt the circuit which operated the motor 132 at low speed; and thereupon that motor will come to rest. The shifting of the movable contact 138 into engagement with the fixed contact 140 will not energize the motor 132 because the movable contact 172 will be in engagement with the fixed contact 176 of the switch 164, and that fixed contact is not connected to anything.

Thermosyphon effect will cause air to continue to move past the heat exchanger 126, and that movement of air will be helpful in preventing too-rapid cooling of the temperature within the room. However, the capacity of the heat exchanger 126 will be such that the thermosyphon effect will not be able to raise the temperature within the room to an uncomfortable level.

When the temperature within the room falls slightly, the movable contact 138 will shift back into engagement with the fixed contact 142 and thereby re-establish the circuit which operated the motor 132 at low speed. If the movement of air at low speed past the heat exchanger 126 is sufficient to raise the temperature within the room to the point where the movable contact 138 again shifts out of engagement with the fixed contact 142, the thermostat 156 will permit that motor to come to rest.

However, if the movement of air at low speed past the heat exchanger 126 is not sufficient to keep the movable contact 144 of the thermostat 156 from moving out of engagement with the fixed contact 146 and into engagement with the fixed contact 148, that movable contact will shift into engagement with the fixed contact 148 and cause the motor 132 to operate at medium speed. If the subsequent movement of air past the heat exchanger 126 at medium speed is sufficient to increase the temperature within the room to the point where the movable contact 144 again shifts back into engagement with the fixed contact 146, the motor 132 will operate at low speed.

However, if the movement of air past the heat exchanger 126 at medium speed is not sufficient to keep the temperature within the room high enough to keep the movable contact 150 from shifting into engagement with the fixed contact 154, that movable contact will so shift; and thereupon the motor 132 will operate at high speed. As the air moves at high speed past the heat exchanger 126, it will cause the temperature within the room to rise to the point where the movable contact 150 will again shift out of engagement with the fixed contact 154 and into engagement with the fixed contact 152. Thereafter, the motor 132 will operate at medium speed, until the temperature rises far enough to cause the movable contact 144 to shift into engagement with the fixed contact 146 and thereby cause the motor to operate at low speed, or the temperature drops far enough to cause the movable contact 150 to shift back into engagement with the fixed contact 154 and thereby cause the motor 132 to operate at high speed.

With this arrangement, the control system will always provide the minimum speed for motor 132 that is compatible with comfort for the occupant of the room. As a result, that control system will always keep the noise level at the minimum value compatible with comfort for the occupant of the room and will also minimize drafts within the room.

The fact that the switch 164 automatically responds to the temperature of the pipe 124 to shift the movable contacts of that switch to summer or winter position is important; because it will keep that switch from being in the summer position during the heating season. If that switch were to be permitted to remain in the summer position during the heating season, the thermostat 156 would be unable to de-energize the motor 132 when the temperature within that room reached the upper limit of the temperature range of that thermostat. Specifically, if the movable contacts 138, 144 and 150 shift, respectively, into engagement with the fixed contacts 140, 146 and 152, as they will do when the temperature within the room reaches the upper limit of the temperature range of the thermostat 156, the motor 132 will continue to be energized by a circuit which extends from terminal 110 via conductor 115, switch 116, conductor 117, junction 114, conductor 136, the movable and fixed contacts 150 and 152, conductor 160, the movable and fixed contacts 144 and 146, conductor 158, the movable and fixed contacts 138 and 140, conductor 184, the movable and fixed contacts 172 and 174, conductor 198, junction 202, conductor 196, junction 193, conductor 192, motor 132, conductor 199, and thence past junction 122 to terminal 112. That circuit will operate the motor 132 continuously at high speed, and the resulting movement of high speed air past the heat exchanger 126 will cause overheating of the room. All such overheating of the room is completely avoided by the present invention, because the switch 164 will automatically respond to the passage of heated heat-exchanging medium through the pipe 124 to shift the movable contacts 166, 172 and 178 into engagement with the fixed contacts 170, 176 and 182 respectively.

FIG. 3 discloses the heat exchanger and control system of FIG. 2, with the exception that the movable contacts 166, 172 and 178 of the summer-winter switch 164 are biased into engagement with the fixed contacts 170, 176 and 182, respectively, by a spring, not shown, and respond to energization of a coil 210 to shift out of engagement with those fixed contacts and into engagement with the fixed contacts 168, 174 and 180. One terminal of the coil 210 is connected to the conductor 199 by a junction 212, and the other terminal of that coil is connected to the junction 114 by a temperature-responsive switch 214. That switch will be mounted in heat-exchanging relation with the pipe 124 and will be open whenever heated heat-exchanging medium is flowing through that pipe. That switch will, however, close whenever cooled heat-exchanging medium is flowing through that pipe. The function and operation of the heat exchanger and control system of FIG. 3 will be identical to the function and operation of the heat exchanger and control system of FIG. 2.

FIGS. 2 and 3 show two arrangements for shifting the movable contacts 166, 172 and 178 of the switch 164. However, where desired, other arrangements could be provided to shift those movable contacts.

The heat exchangers of FIGS. 1–3 are incorporated within "two-pipe" heating and cooling systems; but the control systems of FIGS. 1–3 are not restricted to use with heat exchangers incorporated within such systems. Instead, those control systems can be used with heat exchangers that are incorporated within "three pipe" and "four pipe" heating and cooling systems. In fact, those control systems can be used with heat exchangers that are incorporated within any type of heating and cooling system that utilizes blowers and is controlled by thermostats and summer-winter switches.

The summer-winter switches of FIGS. 1–3 are shown as being responsive to the temperatures of the pipes which conduct the liquid heat-exchanging medium to the heat exchangers. With "three pipe," "four pipe," and other heating and cooling systems, it may be desirable to make the summer-winter switches respond to the temperatures of the heat exchangers themselves; but this is easily accomplished.

In the foregoing description, the thermostats 56 and 156 have been decsribed as being located within the room which is being heated or cooled. In actual practice the thermostats 56 and 156 are located within the housings for the heat exchangers 26 and 126; and the temperature-sensitive portions of those thermostats are located adjacent the air inlets of those housings. As a result those thermostats are able to provide a prompt and accurate temperature-controlling action.

In the foregoing description, the temperature-sensitive elements of the summer-winter switches 64, 78 and 164 have been described as being bulbs. In many cases, however, those temperature-sensitive elements will be bi-metallic elements. Whether those temperature-sensitive elements are bulbs or bi-metallic elements, the operation of the summer-winter switches 64, 78 and 164 will be the same.

In the foregoing description, the summer-winter switches 64 and 78 have been described as being separate and independent. In many instances, however, it will be desirable to combine those switches into one summer-winter switch having just one temperature-sensitive element. Such a summer-winter switch would cause the movable contacts 66 and 80, respectively, to simultaneously move into engagement with the fixed contacts 70 and 84 when cooled heat-exchanging medium started flowing through the pipe 24. Conversely, that summer-winter switch would cause the movable contacts 66 and 80, respectively, to simultaneously move into engagement with the fixed contacts 68 and 82 when heated heat-exchanging medium started flowing through the pipe 24. Whether the two summer-winter switches 64 and 78 are used or just one summer-winter switch is used, the operation of the control system of FIG. 1 will be the same.

In the drawing, the temperature-sensitive elements 72, 86 and 165 are shown as being mounted in engagement with those portions of the pipes 24 and 124 which are intermediate the valves 20 and 120 and the source of heat-exchanging medium. In actual practice, however, the temperature-sensitive elements 72, 86 and 165 are mounted in engagement with those portions of the pipes 24 and 124 which are intermediate the valves 20 and 120 and the heat exchangers 26 and 126.

In the foregoing description, the valves 20 and 120 were described as controlling the flow of heat-exchanging medium to just one room per valve. However where desired, each of those valves could be used to control the flow of heat-exchanging medium to a number of rooms per valve. It should be noted that whenever the valve 20 or the valve 120 is used to control the flow of heat-exchanging medium to a number of rooms, the switches 38 and 40 or the switch 116 in each of those rooms should be closed as soon as the valve 20 or 120 is opened.

Where desired, the wiper switch 38 in FIG. 1 can be eliminated and the junction 14 can be connected directly to the movable contact 58 of the thermostat 56. Where that switch is eliminated, the motor 32 will always run whenever the summer-winter switches 64 and 78 are in their summer positions.

In the foregoing description, the motors 32 and 132 have been described as being fixed-speed motors having three fixed speeds. However, those motors could be fixed-speed motors having fewer or more than three fixed speeds. Further, those motors could be variable speed motors, or they could be single speed motors which could be operated at different speeds by control systems employing variable impedance elements.

In the foregoing description of the operation of the control systems of FIGS. 1–3, reference was made to the solenoid-operated valves 20 and 120. The operation of those control systems would be the same if manually-operated valves were substituted for the solenoid-operated valves 20 and 120.

In geographic areas where sub-freezing temperatures are experienced, the switch 16 should be left closed, whenever sub-freezing temperatures are expected, to enable heated heat-exchanging medium to flow through the heat exchanger 26. That heat-exchanging medium would serve to prevent freezing of that heat exchanger. In such geographic areas the switch 116 should be closed whenever sub-freezing temperatures are expected, to enable heated heat-exchanging medium to flow through the heat exchanger 126. However, the closing of that switch will start the motor 132 and cause it to operate until the temperature within the room rises to the level set by the thermostat 156. If it is desirable to cause heated heat-exchanging medium to flow to the heat exchanger 126 without also causing the motor 132 to operate, a manually-operated valve should be substituted for the valve 120.

Whereas the drawing and accompanying description have shown and described several preferred embodiments of the present invention, it should be apparent to those skilled in the art that various changes may be made in the form of the invention without affecting the scope thereof.

What I claim is:
1. A control system which comprises:
 (a) a heat exchanger that has a conduit connected to it to cause heat-exchanging medium to flow through it, and
 (b) that is adapted to cool or heat air moved in contact therewith,
 (c) a valve that is connected to said conduit and that can be opened or closed to permit or prevent the flow of said heat-exchanging medium through said heat exchanger,
 (d) an electrically-responsive element that is associated with said valve and that can actuate said valve,
 (e) a switch that controls the energization of said electrically-responsive element and thereby controls actuation of said valve,
 (f) a blower that is mounted adjacent said heat exchanger and that can move air in contact with said heat exchanger,
 (g) a plural-speed motor that has a higher speed terminal and a low speed terminal and that is adapted to operate said blower at a plurality of different speeds,
 (h) a thermostat that can be located within a space and which can respond to temperatures within that space,
 (i) said thermostat having a movable contact and a low temperature contact and a higher temperature contact,
 (j) said movable contact being in engagement with said low temperature contact whenever the temperature within said space is at or below a predetermined low temperature,
 (k) said movable contact being in engagement with said higher temperature contact whenever the temperature within said space is at a predetermined higher temperature,
 (l) a speed-selection switch that has a higher speed terminal connected to said higher speed terminal of said motor and that has a low speed terminal connected to said low speed terminal of said motor and that is adapted to select the operating speed of said motor,
 (m) a summer-winter switch that is mounted in heat-exchanging relation to said heat-exchanging medium, and
 (n) that has a summer position and a winter position, and that responds to the temperature of said heat-exchanging medium, after opening of said valve, to assume its proper position,
 (o) said summer-winter switch having a fixed summer contact and a fixed winter contact and a movable contact that selectively engages said fixed summer contact and said fixed winter contact,
 (p) said summer-winter switch having a second fixed summer contact and a second movable contact that selectively engages said second fixed summer contact,
 (q) said low temperature contact of said thermostat being connected to said fixed winter contact and to said second movable contact of said summer-winter switch,
 (r) said higher temperature contact of said thermostat being connected to the first said fixed summer contact of said summer-winter switch, (s) the first said movable contact of said summer-winter switch being connected to said speed selection switch, (t) said second fixed summer contact of said summer-winter switch being connected to said low speed terminal of said motor, (u) said second movable contact and said second fixed summer contact of said summer-winter switch coacting with said thermostat to connect said low temperature contact of said thermostat with said low speed terminal of said motor when the temperature within said space is at or below said predetermined low temperature irrespective of the motor speed selected by said speed selection switch, (v) the first said movable contact and the first said fixed summer contact of said summer-winter switch coacting with said thermostat and said speed selection switch to connect said higher temperature contact with said higher speed terminal of said motor when the temperature within said space is at said predetermined higher temperature and when said speed selection switch selects said higher speed terminal, (w) whereby said motor will, when said summer-winter switch is in its summer position, operate said blower at low speed whenever the temperature within said space is at or below said predetermined low temperature but will operate said blower at said higher speed whenever the temperature within said space is at said predetermined higher temperature, (x) the first said movable contact and said fixed winter contact of said summer-winter switch coacting with said thermostat and said speed selector switch to connect said low temperature contact of said thermostat with said higher speed terminal of said motor when the temperature within said space is at or below said predetermined low temperature and when said speed selection switch selects said higher speed terminal, (y) said thermostat and said second movable contact of said summer-winter switch de-energizing said motor whenever the temperature within said space is at said predetermined higher temperature, (z) whereby said motor will, when said summer-winter switch is in its winter position, operate said blower at said higher speed whenever the temperature within said space is at or below said predetermined low temperature but will be de-energized whenever the temperature within said space is at said predetermined higher temperature, (aa) said summer-winter switch being responsive to the temperature of said heat exchanging medium and automatically assuming its summer position whenever said heat exchanger receives cool heat-exchanging medium to enable it to cool the air moved in contact therewith and automatically assuming its winter position whenever said heat exchanger receives hot heat-exchanging medium to enable it to heat the air moved in contact therewith, and (ab) a circuit that includes said switch and said electrically responsive element and that holds said valve open continuously throughout the heating or cooling operation of said heat exchanger, (ac) said summer-winter switch responding to the temperature of said heat-exchanging medium flowing to said heat exchanger to assume its proper position and thereby enable said thermostat and said speed-selection switch to control the speed of said motor, (ad) said thermostat and said summer-winter switch keeping said motor energized continuously, irrespective of the setting of said speed-selection switch, whenever said summer-winter switch is in its summer position.

2. A control system which comprises:

(a) a heat exchanger, with a valve that continuously supplies heat-exchanging medium to said heat exchanger during the heating or cooling operation of said control system, (b) that is adapted to cool or heat air moved in contact therewith, (c) a blower that is mounted adjacent said heat exchanger and that can move air in contact with said heat exchanger, (d) a plural-speed motor that has a higher speed terminal and a low speed terminal and that is adapted to operate said blower at a plurality of different speeds, (e) a thermostat that can be located within a space and which can respond to temperatures within that space, (f) said thermostat having a movable contact and a low temperature contact and a higher temperature contact, (g) said movable contact being in engagement with said low temperature contact whenever the temperature within said space is at or below a predetermined low temperature, (h) said movable contact being in engagement with said higher temperature contact whenever the temperature within said space is at a predetermined higher temperature, (i) a speed-selection switch that has a higher speed terminal connected to said higher speed terminal of said motor and that has a low speed terminal connected to said low speed terminal of said motor and that is adapted to select the operating speed of said motor, and (j) a summer-winter switch that is mounted in heat-exchanging relation to said heat-exchanging medium, and (k) that has a summer position and a winter position, (l) said summer-winter switch having a fixed summer contact and a fixed winter contact and a movable contact that selectively engages said fixed summer contact and said fixed winter contact, (m) said summer-winter switch having a second fixed summer contact and a second movable contact that selectively engages said second fixed summer contact, (n) said low temperature contact of said thermostat being connected to said fixed winter contact and to said second movable contact of said summer-winter switch, (o) said higher temperature contact of said thermostat being connected to the first said fixed summer contact of said summer-winter switch, (p) the first said movable contact of said summer-winter switch being connected to said speed selection switch, (q) said second fixed summer contact of said summer-winter switch being connected to said low speed terminal of said motor, (r) said second movable contact and said second fixed summer contact of said summer-winter switch coacting with said thermostat and said speed selection switch to connect said low temperature contact of said thermostat with said low speed terminal of said motor when the temperature within said space is at or below said predetermined low temperature irrespective of the motor speed selected by said speed selection switch, (s) the first said movable contact and the first said fixed summer contact of said summer-winter switch coacting with said thermostat and said speed selection switch to connect said higher temperature contact with said higher speed terminal of said motor when the temperature within said space is at said predetermined higher temperature and when said speed selection switch selects said higher speed terminal,
(t) whereby said motor will, when said summer-winter switch is in its summer position, operate said blower at low speed whenever the temperature within said space is at or below said predetermined low temperature but will operate said blower at said higher speed whenever the temperature within said space is at said predetermined higher temperature,
(u) the first said movable contact and said fixed winter contact of said summer-winter switch coacting with said thermostat and said speed selection switch to connect said low temperature contact of said thermostat with said higher speed terminal of said motor when the temperature within said space is at or below said predeterimned low temperature and when said speed selection switch selects said higher speed terminal,
(v) said thermostat and said second movable contact of said summer-winter switch de-energizing said motor whenever the temperature within said space is at said predetermined higher temperature,
(w) whereby said motor will, when said summer-winter switch is in its winter position, operate said blower at said higher speed whenever the temperature within said space is at or below said predetermined low temperature but will be de-energized whenever the temperature within said space is at said predetermined higher temperature,
(x) said summer-winter switch being responsive to the temperature of said heat-exchanging medium and automatically assuming its summer position whenever said heat exchanger receives cool heat-exchanging medium to enable it to cool the air moved in contact therewith and automatically assuming its winter position whenever said heat exchanger receives hot heat-exchanging medium to enable it to heat the air moved in contact therewith,
(y) said thermostat and said summer-winter switch keeping said motor energized continuously, irrespective of the setting of said speed-selection switch, whenever said summer-winter switch is in its summer position.

3. A control system which comprises:
(a) a heat exchanger, with a valve that continuously supplies heat-exchanging medium to said heat exchanger during the heating or cooling operation of said control system,
(b) that is adapted to cool or heat air moved in contact therewith,
(c) a blower that is mounted adjacent said heat exchanger and that can move air in contact with said heat exchanger,
(d) a plural-speed motor that has a higher speed terminal and a low speed terminal and that is adapted to operate said blower at a plurality of different speeds,
(e) a thermostat that can be located within a space and which can respond to temperatures within that space,
(f) said thermostat having a movable contact and a low temperature contact and a higher temperature contact,
(g) said movable contact being in engagement with said low temperature contact whenever the temperature within said space is at or below a predetermined low temperature,
(h) said movable contact being in engagement with said higher temperature contact whenever the temperature within said space is at a predetermined higher temperature, and
(i) a summer-winter switch
(j) that has a summer position and a winter position,
(k) said summer-winter switch having a fixed summer contact and a fixed winter contact and a movable contact that selectively engages said fixed summer contact and said fixed winter contact,
(l) said summer-winter switch having a second fixed summer contact and a second movable contact that selectively engages said second fixed summer contact,
(m) said low temperature contact of said thermostat being connected to said fixed winter contact and to said second movable contact of said summer-winter switch,
(n) said higher temperature contact of said thermostat being connected to the first said fixed summer contact of said summer-winter switch,
(o) the first said movable contact of said summer-winter switch being connectable to said higher speed terminal of said motor,
(p) said second fixed summer contact of said summer-winter switch being connected to said low speed terminal of said motor,
(q) said second movable contact and said second fixed summer contact of said summer-winter switch coacting with said thermostat to connect said low temperature contact of said thermostat with said low speed terminal of said motor when the temperature within said space is at or below said predetermined low temperature,
(r) the first said movable contact and the first said fixed summer contact of said summer-winter switch coacting with said thermostat to connect said higher temperature contact with said higher speed terminal of said motor when the temperature within said space is at said predetermined higher temperature,
(s) whereby said motor will, when said summer-winter switch is in its summer position, operate said blower at low speed whenever the temperature within said space is at or below said predetermined low temperature but will operate said blower at said higher speed whenever the temperature within said space it at said predetermined higher temperature,
(t) the first said movable contact and said fixed winter contact of said summer-winter switch coacting with said thermostat to connect said low temperature contact of said thermostat with said higher speed terminal of said motor when the temperature within said space is at or below said predetermined low temperature,
(u) said thermostat and said second movable contact of said summer-winter switch de-energizing said motor whenever the temperature within said space is at said predetermined higher temperature,
(v) whereby said motor will, when said summer-winter switch is in its winter position, operate said blower at said higher speed whenever the temperature within said space is at or below said predetermined low temperature but will be de-energized whenever the temperature within said space is at said predetermined higher temperature,
(w) said summer-winter switch being responsive to temperature and automatically assuming its summer position whenever said heat exchanger receives cool heat-exchanging medium to enable it to cool the air moved in contact therewith and automatically assuming its winter position whenever said heat exchanger receives hot heat-exchanging medium to enable it to heat the air moved in contact therewith,
(x) said thermostat and said summer-winter switch keeping said motor energized continuously whenever said summer-winter switch is in its summer position.

4. A control system which comprises:
(a) a heat exchanger, with a valve that continuously supplies heat-exchanging medium to said heat exchanger during the heating or cooling operation of said control system,
(b) that is adapted to cool or heat air moved in contact therewith,
(c) a blower that is mounted adjacent said heat exchanger and that can move air in contact with said heat exchanger, (d) a plural-speed motor that has a higher speed terminal and a low speed terminal and that is adapted to operate said blower at a plurality of different speeds, (e) a thermostat that can be located within a space and which can respond to temperatures within that space, (f) said thermostat having a movable contact and a low temperature contact and a higher temperature contact, (g) said movable contact being in engagement with said low temperature contact whenever the temperature within said space is at or below a predetermined low temperature, (h) said movable contact being in engagement with said higher temperature contact whenever the temperature within said space is at a predetermined higher temperature, (i) a speed-selection switch that has a higher speed terminal connected to said higher speed terminal of said motor and that has a low speed terminal connected to said low speed terminal of said motor and that is adapted to select the operating speed of said motor, and (j) a summer-winter switch (k) that has a summer position and a winter position, (l) said summer-winter switch, whenever it is in its summer position, coacting with said thermostat to connect said low temperature contact of said thermostat with said low speed terminal of said motor when the temperature within said space is at or below said predetermined low temperature irrespective of the motor speed selected by said speed selection switch, (m) said summer-winter switch, whenever it is in its summer position, coacting with said thermostat to connect said higher temperature contact with said higher speed terminal of said motor when the temperature within said space is at said predetermined higher temperature and when said speed selection switch selects said higher speed terminal, (n) whereby said motor will, when said summer-winter switch is in its summer position operate said blower at low speed whenever the temperature within said space is at or below said predetermined low temperature but will operate said blower at said higher speed whenever the temperature within said space is at said predetermined higher temperature, (o) said summer-winter switch, whenever it is in its winter position, coacting with said thermostat to connect said low temperature contact of said thermostat with said higher speed terminal of said motor when the temperature within said space is at or below said predetermined low temperature and when said speed selection switch selects said higher speed terminal, (p) said summer-winter switch, whenever it is in its winter position, coacting with said thermostat to de-energize said motor when the temperature within said space is at said predetermined higher temperature, (q) whereby said motor will, when said summer-winter switch is in its winter position, operate said blower at said higher speed whenever the temperature within said space is at or below said predetermined low temperature but will be de-energized whenever the temperature within said space is at said predetermined higher temperature, (r) said summer-winter switch being responsive to temperature and automatically assuming its summer position whenever said heat exchanger receives cool heat-exchanging medium to enable it to cool the air moved in contact therewith and automatically assuming its winter position whenever said heat exchanger receives hot heat-exchanging medium to enable it to heat the air moved in contact therewith, (s) said thermostat and said summer-winter switch keeping said motor energized continuously, irrespective of the setting of said speed-selection switch, whenever said summer-winter switch is in its summer position.

5. A control system which comprises:

(a) a heat exchanger, with a valve that continuously supplies heat-exchanging medium to said heat exchanger during the heating or cooling operations of said control system, (b) that is adapted to cool or heat air moved in contact therewith, (c) a blower that is mounted adjacent said heat exchanger and that can move air in contact with said heat exchanger, (d) a plural-speed motor that has a higher speed terminal and a low speed terminal and that is adapted to operate said blower at a plurality of different speeds, (e) a thermostat that can be located within a space and which can respond to temperatures within that space, (f) said themostat having a movable contact and a low temperature contact and a higher temperature contact, (g) said movable contact being in engagement with said low temperature contact whenever the temperature within said space is at or below a predetermined low temperature, (h) said movable contact being in engagement with said higher temperature contact whenever the temperature within said space is at a predetermined higher temperature, and (i) a summer-winter switch (j) that has a summer position and a winter position, (k) said summer-winter switch having a fixed summer contact and a fixed winter contact and a movable contact that selectively engages said fixed summer contact and said fixed winter contact, (l) said summer-winter switch having a second fixed summer contact and a second movable contact that selectively engages said second fixed summer contact, (m) said second movable contact and said second fixed summer contact of said summer-winter switch coacting with said thermostat to connect said low temperature contact of said thermostat with said low speed terminal of said motor when the temperature within said space is at or below said predetermined low temperature, (n) the first said movable contact and the first said fixed summer contact of said summer-winter switch coacting with said thermostat to connect said higher temperature contact with said higher speed terminal of said motor when the temperature within said space is at said predetermined higher temperature, (o) whereby said motor will, when said summer-winter switch is in its summer position, operate said blower at low speed whenever the temperature within said space is at or below said predetermined low temperature but will operate said blower at said higher speed whenever the temperature within said space is at said predetermined higher temperature, (p) the first said movable contact and said fixed winter contact of said summer-winter switch coacting with said thermostat to connect said low temperature contact of said thermostat with said higher speed terminal of said motor when the temperature within said space is at or below said predetermined low temperature, (q) said thermostat and said second movable contact of said summer-winter switch de-energizing said motor whenever the temperature within said space is at said predetermined higher temperature, (r) whereby said motor will, when said summer-winter switch is in its winter position, operate said blower at said higher speed whenever the temperature within said space is at or below said predetermined low temperature but will be de-energized whenever the temperature within said space is at said predetermined higher temperature, (s) said summer-winter switch being responsive to temperature and automatically assuming its summer position whenever said heat exchanger receives cool heat-exchanging medium to enable it to cool the air moved in contact therewith and automatically assuming its winter position whenever said heat exchanger receives hot heat-exchanging medium to enable it to heat the air moved in contact therewith, (t) said thermostat and said summer-winter switch keeping said motor energized continuously whenever said summer-winter switch is in its summer position.

6. A control system which comprises:

(a) a heat exchanger, with a valve that continuously supplies heat-exchanging medium to said heat exchanger during the heating or cooling operation of said control system, (b) that is adapted to cool or heat air moved in contact therewith, (c) a blower that is mounted adjacent said heat exchanger and that can move air in contact with said heat exchanger, (d) a plural-speed motor that has a higher speed terminal and a low speed terminal and that is adapted to operate said blower at a plurality of different speeds, (e) a thermostat that can be located within a space and which can respond to temperatures within that space, (f) said thermostat having a movable contact and a low temperature contact and a higher temperature contact, (g) said movable contact being in engagement with said low temperature contact whenever the temperature within said space is at or below a predetermined low temperature, (h) said movable contact being in engagement with said higher temperature contact whenever the temperature within said space is at a predetermined higher temperature, and (i) a summer-winter switch (j) that has a summer position and a winter position, (k) said summer-winter switch, whenever it is in its summer position, coacting with said thermostat to connect said low temperature contact of said thermostat with said low speed terminal of said motor when the temperature within said space is at or below said predetermined low temperature and coacting with said thermostat to connect said higher temperature contact with said higher speed terminal of said motor when the temperature within said space is at said predetermined higher temperature, (l) whereby said motor will, when said summer-winter switch is in its summer position, operate said blower at low speed whenever the temperature within said space is at or below said predetermined low temperature but will operate said blower at said higher speed whenever the temperature within said space is at said predetermined higher temperature, (m) said summer-winter switch, whenever it is in its winter position, coacting with said thermostat to connect said low temperature contact of said thermostat with said higher speed terminal of said motor when the temperature within said space is at or below said predetermined low temperature and coacting with said thermostat to de-energize said motor whenever the temperature within said space is at said predetermined higher temperature, (n) whereby said motor will, when said summer-winter switch is in its winter position, operate said blower at said higher speed whenever the temperature within said space is at or below said predetermined low temperature but will be de-energized whenever the temperature within said space is at said predetermined higher temperature, (o) said summer-winter switch being responsive to temperature and automatically assuming its summer position whenever said heat exchanger receives cool heat-exchanging medium to enable it to cool the air moved in contact therewith and automatically assuming its winter position whenever said heat exchanger receives hot heat-exchanging medium to enable it to heat the air moved in contact therewith, and (p) said thermostat and said summer-winter switch keeping said motor energized continuously whenever said summer-winter switch is in its summer position.

7. A control system which comprises:

(a) a heat exchanger, with a valve that continuously supplies heat-exchanging medium to said heat exchanger during the heating or cooling operation of said control system, (b) that is adapted to cool or heat air moved in contact therewith, (c) a blower that is mounted adjacent said heat exchanger and that can move air in contact with said heat exchanger, (d) a plural-speed motor that has a low speed terminal and an intermediate speed terminal and a higher speed terminal and that is adapted to operate said blower at a plurality of different speeds, (e) a thermostat that can be located within a space and which can respond to temperatures within that space, (f) said thermostat having a plurality of movable contacts and a low temperature fixed contact and a higher temperature fixed contact and an intermediate temperature fixed contact, (g) the first of said movable contacts being in engagement with said low temperature contact whenever the temperature within said space is at or below a predetermined low temperature, (h) another of said movable contacts being in engagement with said higher temperature contact whenever the temperature within said space is at a predetermined higher temperature, (i) one of said movable contacts being in engagement with said intermediate temperature fixed contact whenever the temperature within said space is at a predetermined intermediate temperature, and (j) a summer-winter switch (k) that has a summer position and a winter position, (l) said summer-winter switch, whenever it is in its summer position, coacting with said thermostat to connect said low temperature contact of said thermostat with said low speed terminal of said motor when the temperature within said space is at or below said predetermined low temperature, (m) said summer-winter switch, whenever it is in its summer position, coacting with said thermostat to connect said intermediate temperature contact with said intermediate speed terminal of said motor when the temperature within said space is at said predetermined intermediate temperature, (n) said summer-winter switch, whenever it is in its summer position, coacting with said thermostat to connect said higher temperature contact with said higher speed terminal of said motor when the temperature within said space is at said predetermined higher temperature, (o) whereby said motor will, when said summer-winter switch is in its summer position, operate said blower at low speed whenever the temperature within said space is at or below said predetermined low temperature but will operate said blower at said higher speed whenever the temperature within said space is at said predetermined higher temperature, and will operate said blower at said intermediate speed whenever the temperature within said space is at said predetermined intermediate temperature, (p) said summer-winter switch, whenever it is in its winter position, coacting with said thermostat to connect said low temperature contact of said thermostat with said higher speed terminal of said motor when the temperature within said space is at or below said predetermined low temperature, (q) said summer-winter switch, whenever it is in its winter position, coacting with said thermostat to connect said intermediate temperature contact with said intermediate speed terminal of said motor when the temperature within said space is at said predetermined intermediate temperature, (r) said summer-winter switch, whenever it is in its winter position, coacting with said thermostat to de-energize said motor whenever the temperature within said space is at said predetermined higher temperature, (s) whereby said motor will, when said summer-winter switch is in its winter position, operate said blower at said higher speed whenever the temperature within said space is at or below said predetermined low temperature but will be de-energized whenever the temperature within said space is at said predetermined higher temperature, and will operate said blower at said intermediate speed whenever the temperature within said space is at said predetermined intermediate temperature, (t) said summer-winter switch being responsive to temperature and automatically assuming its summer position whenever said heat exchanger receives cool heat-exchanging medium to enable it to cool the air moved in contact therewith and automatically assuming its winter position whenever said heat exchanger receives hot heat-exchanging medium to enable it to heat the air moved in contact therewith, (u) said thermostat automatically responding to the temperature within said space to provide a plurality of speeds for said motor whether said summer-winter switch is in its summer or winter position, (v) said thermostat and said summer-winter switch keeping said motor energized continuously whenever said summer-winter switch is in its summer position.

8. A control system that comprises:
(a) a multi-speed motor that has a low-speed terminal and a higher speed terminal,
(b) a thermostat having a movable contact and fixed contacts,
(c) a summer-winter switch that has a summer position and a winter position,
(d) a circuit that includes said movable contact and one fixed contact of said thermostat and said summer-winter switch and said low speed terminal of said motor,
(e) a second circuit that includes said movable contact and a second fixed contact of said thermostat and said summer-winter switch and said higher speed terminal of said motor,
(f) said movable contact of said thermostat being in engagement with said one fixed contact whenever the temperature adjacent said thermostat is at or below the lower limit of the temperature range of said thermostat,
(g) said movable contact of said thermostat being in engagement with said second fixed contact whenever the temperature adjacent said thermostat is at a predetermined level above said lower limit of the temperature range of said thermostat,
(h) said thermostat and said summer-winter switch coacting, whenever said summer-winter switch is in the summer position, to operate said motor at a higher speed whenever said temperature is at said predetermined level and to automatically cause said motor to operate at low speed whenever the temperature adjacent said thermostat is at or below the lower limit of the temperature range of said thermostat, (i) said thermostat and said summer-winter switch coacting, whenever said summer-winter switch is in the winter position, to operate said motor at said higher speed whenever said temperature is at or below the lower limit of the temperature range of said thermostat and to automatically de-energize said motor whenever the temperature adjacent said thermostat is at said predetermined level, (j) a heat exchanger and a valve that continuously supplies heat-exchanging medium to said heat exchanger during the heating or cooling operation of said control system, (k) said summer-winter switch being responsive to temperature and automatically assuming its summer position whenever said heat exchanger receives cool heat-exchanging medium to enable it to cool the air moved in contact therewith and automatically assuming its winter position whenever said heat exchanger receives hot heat-exchanging medium to enable it to heat the air moved in contact therewith.

9. A control system which comprises:
(a) a heat exchanger, with a valve that continuously supplies heat-exchanging medium to said heat exchanger during the heating or cooling operation of said control system,
(b) that is adapted to cool or heat air moved in contact therewith,
(c) a blower that is mounted adjacent said heat exchanger and that can move air in contact with said heat exchanger,
(d) a motor that has a low speed terminal and an intermediate speed terminal and a higher speed terminal and that is adapted to operate said blower at a plurality of different speeds,
(e) a thermostat that can be located within a space and which can respond to temperatures within that space,
(f) said thermostat having a plurality of movable contacts and a low temperature fixed contact and a higher temperature fixed contact and an intermediate temperature fixed contact,
(g) the first of said movable contacts being in engagement with said low temperature contact whenever the temperature within said space is at or below a predetermined low temperature,
(h) another of said movable contacts being in engagement with said higher temperature contact whenever the temperature within said space is at a predetermined higher temperature,
(i) one of said movable contacts being in engagement with said intermediate temperature fixed contact whenever the temperature within said space is at a predetermined intermediate temperature, and
(j) a summer-winter switch,
(k) that has a summer position and a winter position,
(l) said summer-winter switch, whenever it is in its summer position, coacting with said thermostat to cause the first said movable contact and said low temperature contact of said thermostat to operate said motor at low speed when the temperature within said space is at or below said predetermined low temperature,
(m) said summer-winter switch, whenever it is in its summer position, coacting with said thermostat to cause said intermediate temperature contact to operate said motor at an intermediate speed when the temperature within said space is at said predetermined intermediate temperature,
(n) said summer-winter switch, whenever it is in its summer position, coacting with said thermostat to cause said higher temperature contact to operate said motor at higher speed when the temperature within said space is at said predetermined higher temperature,
(o) whereby said motor will, when said summer-winter switch is in its summer position, operate said blower at low speed whenever the temperature within said space is at or below said predetermined low temperature but will operate said blower at said higher speed whenever the temperature within said space is at said predetermined higher temperature, and will operate said blower at said intermediate speed whenever the temperature within said space is at said predetermined intermediate temperature, (p) said summer-winter switch, whenever it is in its winter position, coacting with said thermostat to cause the first said movable contact and said low temperature contact of said thermostat to operate said motor at higher speed when the temperature within said space is at or below said predetermined low temperature, (q) said summer-winter switch, whenever it is in its winter position, coacting with said thermostat to cause said intermediate temperature contact to operate said motor at an intermediate speed when the temperature within said space is at said predetermined intermediate temperature, (r) said summer-winter switch, whenever it is in its winter position, coacting with said thermostat to de-energize said motor whenever the temperature within said space is at said predetermined higher temperature, (s) whereby said motor will, when said summer-winter switch is in its winter position, operate said blower at said higher speed whenever the temperature within said space is at or below said predetermined low temperature but will be de-energized whenever the temperature within said space is at said predetermined higher temperature, and will operate said blower at said intermediate speed whenever the temperature within said space is at said predetermined intermediate temperature, (t) said thermostat automatically responding to the temperature within said space to provide a plurality of speeds for said motor whether said summer-winter switch is in its summer or winter position, (u) said thermostat and said summer-winter switch keeping said motor energized continuously whenever said summer-winter switch is in its summer position.

10. A control system which comprises:
(a) a heat exchanger, with a valve that continuously supplies heat-exchanging medium to said heat exchanger during the heating or cooling operation of said control system,
(b) that is adapted to cool or heat air moved in contact therewith,
(c) a blower that is mounted adjacent said heat exchanger and that can move air in contact with said heat exchanger,
(d) a motor that has a low speed terminal and an intermediate speed terminal and a higher speed terminal and that is adapted to operate said blower at a plurality of different speeds,
(e) a thermostat that can be located within a space and which can respond to temperatures within that space,
(f) said thermostat having a plurality of movable contacts and a low temperature fixed contact and a higher temperature fixed contact and an intermediate temperature fixed contact,
(g) the first of said movable contacts being in engagement with said low temperature contact whenever the temperature within said space is at or below a predetermined low temperature,
(h) another of said movable contacts being in engagement with said higher temperature contact whenever the temperature within said space is at a predetermined higher temperature,
(i) one of said movable contacts being in engagement with said intermediate temperature fixed contact whenever the temperature within said space is at a predetermined intermediate temperature, and
(j) a summer-winter switch
(k) that has a summer position and a winter position,
(l) said summer-winter switch, whenever it is in its summer position, coacting with said thermostat to cause the first said movable contact and said low temperature contact of said thermostat to operate said motor at low speed when the temperature within said space is at or below said predetermined low temperature,
(m) said summer-winter switch, whenever it is in its summer position, coacting with said thermostat to cause said intermediate temperature contact to operate said motor at an intermediate speed when the temperature within said space is at said predetermined intermediate temperature,
(n) said summer-winter switch, whenever it is in its summer position, coacting with said thermostat to cause said higher temperature contact to operate said motor at higher speed when the temperature within said space is at said predetermined higher temperature,
(o) whereby said motor will, when said summer-winter switch is in its summer position, operate said blower at low speed whenever the temperature within said space is at or below said predetermined low temperature but will operate said blower at said higher speed whenever the temperature within said space is at said predetermined higher temperature, and will operate said blower at said intermediate speed whenever the temperature within said space is at said predetermined intermediate temperature,
(p) said summer-winter switch, whenever it is in its winter position, coacting with said thermostat to cause said motor to operate at higher speed when the temperature within said space is at or below said predetermined low temperature,
(q) said summer-winter switch, whenever it is in its winter position, coacting with said thermostat to cause said motor to operate at an intermediate speed when the temperature within said space is at said predetermined intermediate temperature,
(r) said summer-winter switch, whenever it is in its winter position, coacting with said thermostat to de-energize said motor whenever the temperature within said space is at said predetermined higher temperature,
(s) whereby said motor will, when said summer-winter switch is in its winter position, operate said blower at said higher speed whenever the temperature within said space is at or below said predetermined low temperature but will be de-energized whenever the temperature within said space is at said predetermined higher temperature, and will operate said blower at said intermediate speed whenever the temperature within said space is at said predetermined intermediate temperature,
(t) said thermostat automatically responding to the temperature within said space to provide a plurality of speeds for said motor whether said summer-winter switch is in its summer or winter position,
(u) said motor having said low speed terminal connected to a summer contact adjacent a movable contact of said summer-winter switch and also connected to a winter contact adjacent a second movable contact of said summer-winter switch,
(v) said motor having said higher speed terminal connected to the winter contact adjacent the first said movable contact of said summer-winter switch and also connected to the summer contact adjacent said second movable contact of said summer-winter switch,
(w) said thermostat and said summer-winter switch keeping said motor energized continuously whenever said summer-winter switch is in its summer position.

11. A control system which comprises:
(a) a heat exchanger, with a valve that continuously supplies heat-exchanging medium to said heat exchanger during the heating or cooling operation of said control system,
(b) that is adapted to cool or heat air moved in contact therewith,
(c) a blower that is mounted adjacent said heat exchanger and that can move air in contact with said heat exchanger,
(d) a motor that is adapted to operate said blower at a plurality of different speeds,
(e) a thermostat that can be located within a space and which can respond to temperatures within that space,
(f) said thermostat having a plurality of movable contacts and a low temperature fixed contact and a higher temperature fixed contact and an intermediate temperature fixed contact,
(g) the first of said movable contacts being in engagement with said low temperature contact whenever the temperature within said space is at or below a predetermined low temperature,
(h) another of said movable contacts being in engagement with said higher temperature contact whenever the temperature within said space is at a predetermined higher temperature,
(i) one of said movable contacts being in engagement with said intermediate temperature fixed contact whenever the temperature within said space is at a predetermined intermediate temperature, and
(j) a summer-winter switch
(k) that has a summer position and a winter position,
(l) said summer-winter switch, whenever it is in its summer position, coacting with said thermostat to operate said motor at low speed when the temperature within said space is at or below said predetermined low temperature,
(m) said summer-winter switch, whenever it is in its summer position, coacting with said thermostat to operate said motor at an intermediate speed when the temperature within said space is at said predetermined temperature,
(n) said summer-winter switch, whenever it is in its summer position, coacting with said thermostat to operate said motor at higher speed when the temperature within said space is at said predetermined higher temperature,
(o) said summer-winter switch, whenever it is in its winter position, coacting with said thermostat to cause said motor to operate at higher speed when the temperature within said space is at or below said predetermined low temperature,
(p) said summer-winter switch, whenever it is in its winter position, coacting with said thermostat to cause said motor to operate at an intermediate speed when the temperature within said space is at said predetermined intermediate temperature,
(q) said summer-winter switch, whenever it is in its winter position, coacting with said thermostat to de-energize said motor whenever the temperature within said space is at said predetermined higher temperature,
(r) said thermostat automatically responding to the temperature within said space to provide a plurality of speeds for said motor whether said summer-winter switch is in its summer or winter position,
(s) said thermostat and said summer-winter switch keeping said motor energized continuously whenever said summer-winter switch is in its summer position.

12. A control system which comprises:
(a) a heat exchanger, with a valve that continuously supplies heat-exchanging medium to said heat exchanger during the heating or cooling operation of said control system,
(b) that is adapted to cool or heat air moved in contact therewith,
(c) a blower that is mounted adjacent said heat exchanger and that can move air in contact with said heat exchanger,
(d) a motor that can drive said blower at different speeds,
(e) a thermostat that can be located within a space and which can respond to temperatures within that space,
(f) said thermostat having a movable contact and a low temperature contact and a higher temperature contact,
(g) said movable contact being in engagement with said low temperature contact whenever the temperature within said space is at or below a predetermined low temperature,
(h) said movable contact being in engagement with said higher temperature contact whenever the temperature within said space is at a predetermined higher temperature, and
(i) a summer-winter switch
(j) that has a summer position and a winter position,
(k) said summer-winter switch, whenever it is in its summer position, coacting with said thermostat to cause said motor to drive said blower at low speed when the temperature within said space is at or below said predetermined low temperature and coacting with said thermostat to cause said motor to drive said blower at higher speed when the temperature within said space is at said predetermined higher temperature,
(l) said summer-winter switch, whenever it is in its winter position, coacting with said thermostat to cause said motor to drive said blower at said higher speed when the temperature within said space is at or below said predetermined low temperature and coacting with said thermostat to de-energize said motor whenever the temperature within said space is at said predetermined higher temperature,
(m) said summer-winter switch being responsive to temperature and automatically assuming its summer position whenever said heat exchanger receives cool heat-exchanging medium to enable it to cool the air moved in contact therewith and automatically assuming its winter position whenever said heat exchanger receives hot heat-exchanging medium to enable it to heat the air moved in contact therewith,
(n) said thermostat and said summer-winter switch keeping said motor energized continuously whenever said summer-winter switch is in its summer position.

References Cited by the Examiner
UNITED STATES PATENTS
2,267,165  12/41  Parsons _____ 236—1
2,953,356  9/60   Soule _____ 236—1
2,957,680  10/60  Sterner _____ 236—1

OTHER REFERENCES

Air Conditioning, Heating and Ventilating, April 1960, pages 69–71, pub. by the Industrial Press, New York, N.Y.

Heating, Piping and Air Conditioning, November 1961, pages 146–151, pub. by Keeney Publishing Co., Chicago, Ill.

EDWARD J. MICHAEL, *Primary Examiner.*

PERCY L. PATRICK, *Examiner.*